United States Patent [19]

Parulski et al.

[11] Patent Number: 5,285,237
[45] Date of Patent: Feb. 8, 1994

[54] PHOTOPRINT RETAINING PLATEN FOR DIGITIZING IMAGE SCANNER

[75] Inventors: Kenneth A. Parulski; Richard F. Manley; Alan G. Reddig, all of Rochester, N.Y.

[73] Assignee: Eastman Kodak Company, Rochester, N.Y.

[21] Appl. No.: 760,437

[22] Filed: Sep. 16, 1991

[51] Int. Cl.⁵ .............................................. G03B 27/62
[52] U.S. Cl. ....................................................... 355/75
[58] Field of Search ............................ 355/72, 75, 122; 430/499; 354/312

[56] References Cited

U.S. PATENT DOCUMENTS

| | | | |
|---|---|---|---|
| 4,279,988 | 7/1981 | Ewald | 430/499 |
| 4,288,156 | 9/1981 | Savage | 354/312 |
| 4,405,228 | 9/1983 | Muscoplat | 355/75 |
| 4,637,712 | 1/1987 | Arnold et al. | 355/75 |
| 4,975,735 | 12/1990 | Bright et al. | 355/75 |

FOREIGN PATENT DOCUMENTS

3937556A1  5/1991  Fed. Rep. of Germany .

*Primary Examiner*—Richard A. Wintercorn
*Attorney, Agent, or Firm*—David M. Woods

[57] ABSTRACT

A photoprint mounting platen facilitates presentation of a photoprint to an imaging station of photoprint imaging scanner, in a secure protected condition. The configuration of the platen is such that it allows a plurality of photoprint platens to be arranged in a stacked configuration and fed one at the time to a platen imaging station, and then fed from the platen imaging station to a take up location. In a first embodiment the platen has a generally flat mounting surface upon which a photoprint is attachable, and first and second end edges and first and second side edges. One or more regions are located adjacent to the mounting surface area for storing machine readable photoprint parameter information. The platen further includes a plurality of side rail elements extending above the first surface by a height greater than the thickness of a photoprint, so that multiple platens may be stacked together without a photoprint contacting an adjacent platen. In a second embodiment the platen comprises a substrate having a generally flat mounting surface upon which the photoprint is to be placed, the substrate having first and second end edges and first and second side edges. First and second side rail elements adjoin the respective first and second side edges of the substrate and adjoin a transparent cover plate which is arranged to overlie the mounting surface of the substrate and thereby retain a photoprint between itself and the substrate. Ends of the side rail elements have sloped contours to facilitate interleaving of multiple platens together in a stack.

26 Claims, 6 Drawing Sheets

PHOTOPRINT RETAINING PLATEN FOR DIGITIZING IMAGE SCANNER

FIELD OF THE INVENTION

The present invention relates in general to digital image processing systems and is particularly directed to a photoprint retaining platen for securely retaining a photographic print in a flat, protected condition and facilitating presentation of the photoprint to an imaging station of an opto-electronic digitizing scanner.

BACKGROUND OF THE INVENTION

Recent improvements in their spatial and data resolution capabilities have made digital color image processing systems attractive for a number of photoprocessing (e.g. photo-finishing) applications. In still color image photography, for example, once an image (such as that captured on color photographic film or a high resolution color digital camera) has been digitized and stored in an attendant data base, it is readily optimized for reproduction by means of photofinishing image processing software. Such image processing systems also provide for the storage and retrieval of high resolution digitized color still images for application to a variety of reproduction devices. This not only enables the photofinisher to optimize the quality of a color image print, but allows the images on a processed roll of film to be stored in digital format on a compact disc (CD), which may then be delivered to the customer for playback by a CD player and display on a television set.

One such apparatus is described in co-pending U.S. patent application Ser. No. 582,305, filed Sep. 14, 1990, now U.S. Pat. No. 5,218,455, issued Jun. 8, 1993 entitled "Multiresolution Digital Imagery Photofinishing System, by S. Kristy, assigned to the assignee of the present application and the disclosure of which is herein incorporated. As diagrammatically illustrated in FIG. 1, such a digitizing apparatus may employ a high resolution opto-electronic film scanner 12, the output of which is coupled to a host digitized image processor (host computer) 14. Scanner 12 typically contains a very high resolution sensor pixel array (a 3072×2048 pixel matrix) capable of generating high spatial density-representative output signals which, when converted into digital format, yield 'digitized' photographic image files from which high quality color prints may be obtained. Scanner 12 is arranged to be optically coupled with a photographic recording medium, such as a consumer-supplied 35 mm color film strip 16. Film strip 16 contains a plurality (e.g. a set of twenty- four or thirty-six) 36 mm×24 mm color image frames. For each scanned image frame, high resolution scanner 12 outputs digitally encoded data, representative of the opto-electronic response of its high resolution imaging sensor pixel array, onto which a respective photographic image frame of film strip 16 is projected by the scanner's input lens system.

This digitally encoded data, or 'digitized' image, is supplied in the form of an imaging pixel array- representative bit map, resolved to a prescribed code width (e.g. eight bits per color per pixel), to a host processor 14. Host processor 14 contains an image encoding and storage operator through which each high resolution digitized image file is stored, preferably in a multiresolution, hierarchical format, in order to facilitate retrieval of the digitized images for reproduction by a variety of devices the resolution of which may vary from device to device, such as a low/moderate NTSC television monitor or a very high resolution, digitally driven, color thermal printer. The spatial parameters of each of the hierarchical image files into which an original 2K pixel×3K pixel digitized image file is encoded and stored are chosen to facilitate the implementation and incorporation of a low cost, reduced complexity frame store/-data retrieval architecture into a variety of reproduction devices, thereby providing for rapid call-up and output (display or print out) of one or more selected images.

In addition to using such improved photofinishing equipment to process current day images, such as capturing original color images in digital format by way of a high resolution digitizing color camera, or scanning a roll of color negative film, there is also the demand for using such digital image processing capability to convert 'old' photographs, such as dated photoprints that have been 'kept in a shoebox', into digital format for CD storage, thereby allowing a customer to store and catalog the images on such prints for subsequent television viewing.

To meet this need, co-pending application Ser. No. 762,323, filed Sep. 16, 1991, entitled "Dual Imaging Station Scanner", assigned to the assignee of the present application and the disclosure of which is herein incorporated, describes a digitizing scanner apparatus which has the ability to automatically digitize a plurality of photoprint images which the customer brings to the photofinisher in a loosely arrayed pile or mounted in a photo-album binder, thereby allowing a photofinisher to rapidly process any number of pictures supplied by the customer, irrespective of the condition or form in which the photoprints are supplied.

More particularly, FIGS. 2 and 3 diagrammatically show such a dual imaging station photoprint scanner 10 as comprising a housing or cabinet 11 having an upper or topside placement/album imaging station 13 and a lower, magazine-fed platen imaging station 15. Upper imaging station 13 comprises a transparent (e.g. glass) plate 21 upon which a sheet of photographic recording material, such as a photoprint, 23 may be placed in a face-down position. Adjacent to top plate 21, the cabinet has a sloped support surface 25, thereby providing, in cooperation with the top plate, a broad area surface for supporting a large item, such as a photo album (shown diagrammatically in broken lines 27 in its open, face-down condition), so that a page of the photo album may be easily placed in direct imaging-abutment with top plate 21. A first imaging station illuminator 29 utilizing four cylindrical fluorescent lamps arranged in a rectangular configuration and directed to illuminate photoalbum 27, is located beneath top plate 21.

A lower portion of cabinet 21 retains a platen feed mechanism 30, which is operative to withdraw and translate a photographic print support platen from a first supply magazine 32 to platen imaging station 15, and then feed the platen from the platen imaging station to a second take up storage magazine 34. For this purpose, platen feed mechanism comprises a first set of controllably driven pinch rollers 41 located between magazine 32 and platen imaging station 15, and a second set of controllably driven pinch rollers 43 located between platen imaging station 15 and magazine 34. A controllably stepped drive motor 45 is coupled to rollers 41 and 43 by means of a conventional puller/drive belt arrangement, not shown, and is controllably driven by a system microcontroller to rotate the pinch rollers and thereby sequentially extract a platen from a bottom slot 33 of supply magazine 32, translate an extracted platen to imaging station 15 and then translate the platen from imaging station 15 to a lower entry slot 35 of take up storage magazine 34. A second image station illuminator 36, also utilizing four cylindrical fluorescent lamps arranged in a rectangular configuration and directed to illuminate imaging station 15, is located above imaging station 15.

A multi-directional image projection mechanism 50 is supported within housing 11 between upper and lower imaging stations 13 and 15, respectively, and is operable to selectively project one of an image recorded on a sheet of photographic recording material 23 that has been placed face down on top plate 21, is mounted in a photo album 27 that has been placed face down on top plate 21, or an image on a photoprint that has been secured to a platen, shown diagrammatically at 40, fed by platen feed mechanism 30 to lower imaging station 15.

Scanner 10 also contains an opto-electronic conversion device 60 supported within housing 11 at an image projection plane 62 of multi-directional image projection mechanism 50. A digital imagery data recording mechanism 64 is coupled to photo-responsive conversion device 60, and is operative to record, on a digital data storage medium, such as a compact disc, a digitized image that has been projected on the photo-responsive conversion device by the multi-directional image projection mechanism.

Multi-directional image projection mechanism 50 comprises an adjustable image magnification device, such as an adjustable focal length, adjustable focus, zoom lens 52, which is operative to controllably vary the size of the image projected onto the photo-responsive conversion device. The image projection mechanism also includes a first, controllably rotatable mirror 54 disposed between top plate 21 and platen imaging station 15, and a second, fixed mirror 56 disposed in a projection path 58 between rotatable mirror 54 and photo conversion device 60.

SUMMARY OF THE INVENTION

The present invention is directed to a new and improved photoprint mounting platen that is intended to facilitate presentation of a photoprint to the platen imaging station of a photoprint imaging scanner, such as the above-described dual imaging station scanner, in a secure, protected, condition. The configuration of the platen is such that it allows a plurality of photoprint platens to be arranged in a stacked configuration and fed one at the time from a first platen retention magazine to the platen imaging station, and then fed from the platen imaging station to a second take up magazine. The platens stacked in the second magazine are then removed so that the photoprints may be returned to the customer, and the platens may be re-used for subsequent customer prints.

The photoprint support platen pursuant to a first embodiment of the present invention preferably comprises a rigid substrate, such as generally rectangular sheet of polystyrene plastic, having a first, generally flat mounting surface upon which an individual photoprint is placed. A plurality of standoff elements in the form of parallel rails extend alongside the photoprint mounting surface area between first and second end edges of the platen, and have a height greater than the thickness of the photoprint, so that multiple platens may be stacked together without the mounted photoprint contacting an adjacent platen. To facilitate interleaving of multiple platens together in a stacked configuration, each end edge of the platen has a sloped contour.

The platen further includes one or more machine-readable control regions, such as slots in which slidable tabs are provided, bar codes etc. located adjacent to the photoprint mounting surface area. These regions are employed to store machine readable photoprint parameter information representative of one or more characteristics of the image on the photoprint, such as size, aspect ratio, image orientation (horizontal or vertical) and color or black and white. These regions are arranged to be read by sensor elements of the photoprint scanner, in order to control the manner in which the image on the photoprint is projected by associated imaging optics onto an opto-electronics image converter and as playback display control information to be recorded on the compact disc.

A photoprint is attached to the platen by way of one or more attachment elements affixed to the mounting area. A respective attachment element preferably comprises a generally semi-tacky adhesive web disposed on the photograph-mounting surface area of the platen, which securely retains the photoprint in place on the photograph mounting surface area when the photoprint is pressed against the adhesive element.

In accordance with a second embodiment of the invention, the photoprint support platen comprises a rigid substrate which, like the first embodiment, has a first, generally flat mounting surface upon which an individual photoprint is placed. Side edges of the substrate adjoin lower portions of a pair of segmented side rails, which are longer than and extend alongside the photograph mounting surface area. Each end edge of a side rail has a sloped contour to facilitate interleaving of multiple platens together in a stacked configuration.

An upper portion of each side rail adjoins a transparent cover plate, which overlies the support substrate when the respective portions of the segmented side rails are placed in mutual alignment and abutment with one another. The respective upper and lower portions of one of the side rails have interleaving tongue and slots regions which provide for folding attachment of the transparent cover plate to the photoprint support substrate. As a result, when a photoprint placed on the support substrate and the upper and lower portions of the siderails are in mutually abutting engagement, the photoprint will be captured or 'sandwiched' between the transparent plate and the support substrate. The respective upper and lower portions of the other of the side rails have undulating side contours, to facilitate manual separation of its upper and lower portions, so that the transparent plate may be easily lifted away from the support substrate after the photoprint is scanned.

DETAILED DESCRIPTION

Figure 1:
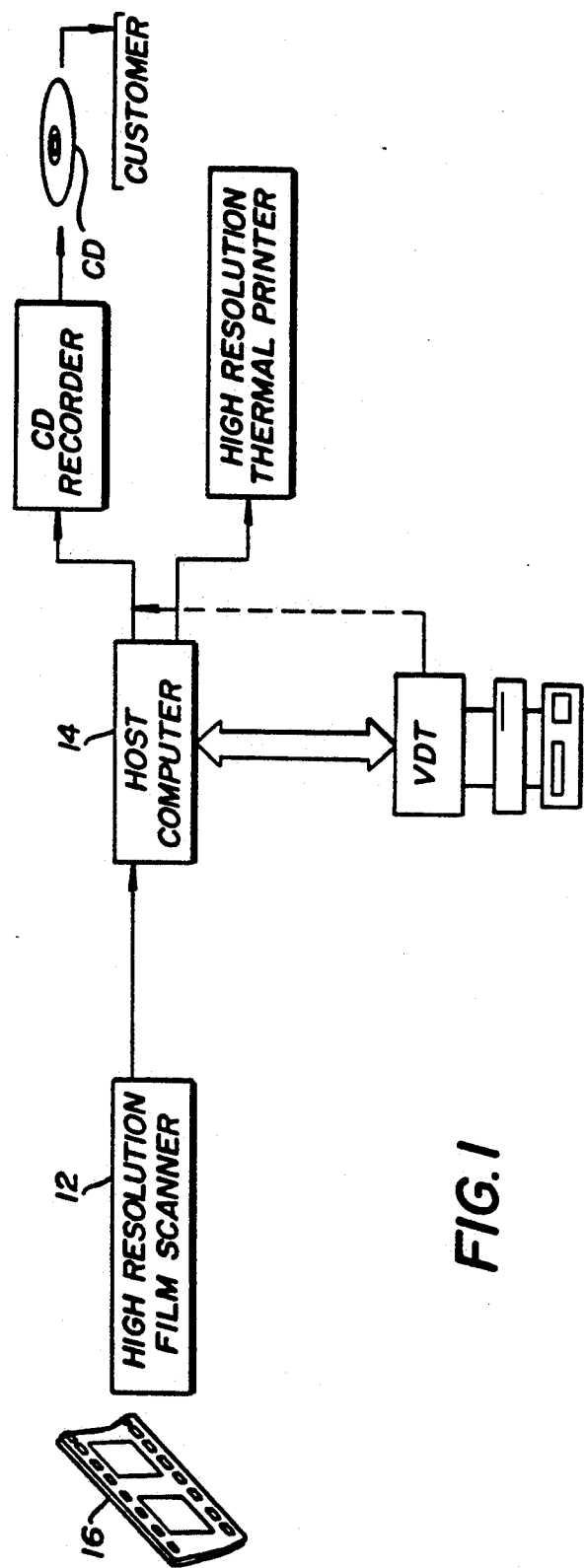
FIG. 1 diagrammatically illustrates a digital imagery photofinishing system.
Figure 2:
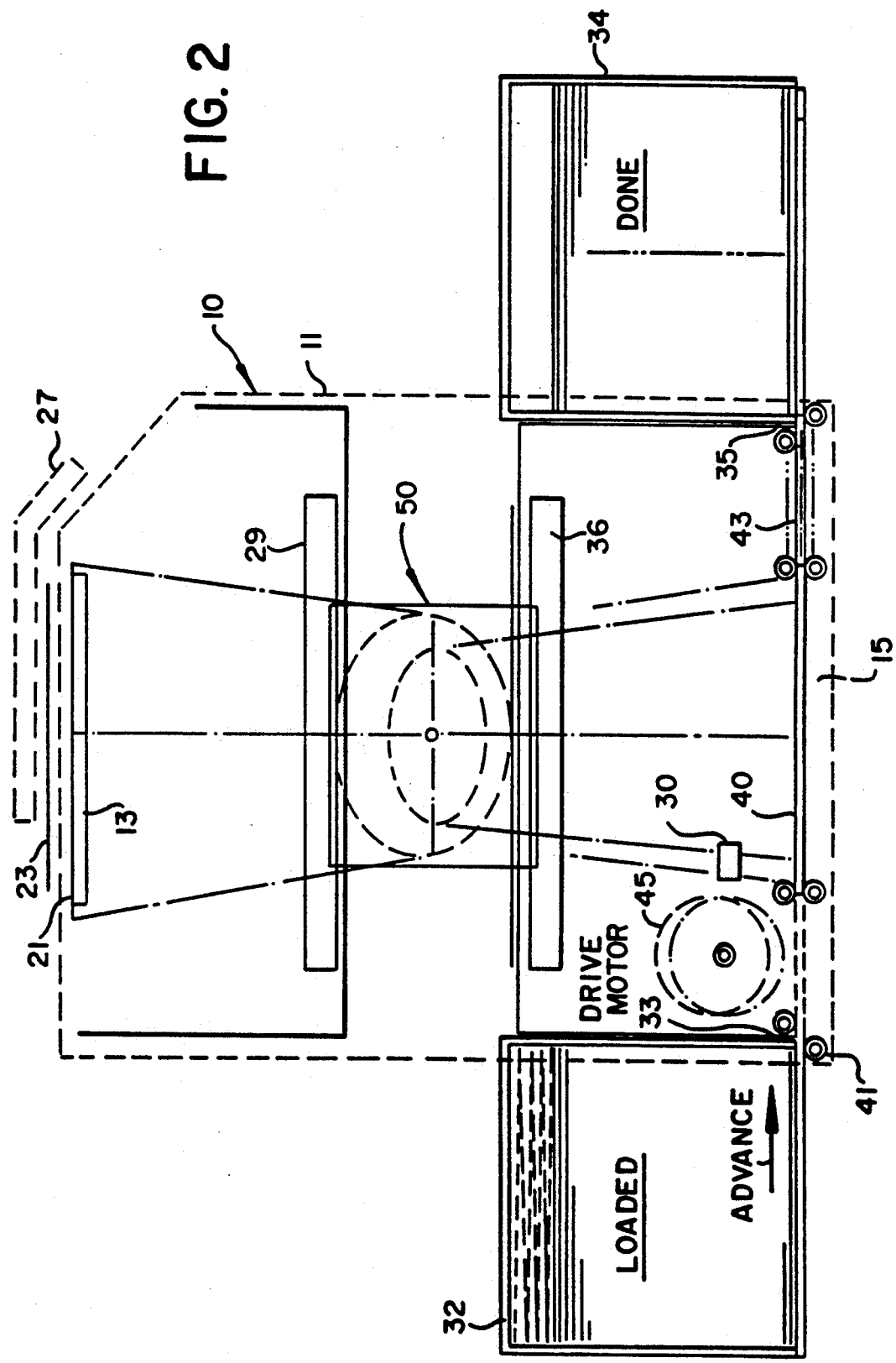
FIGS. 2 and 3 diagrammatically show respective front and side views of the general hardware structure of a dual imaging station photoprint scanner with which the photoprint support platen of the present invention may be used.
Figure 3:
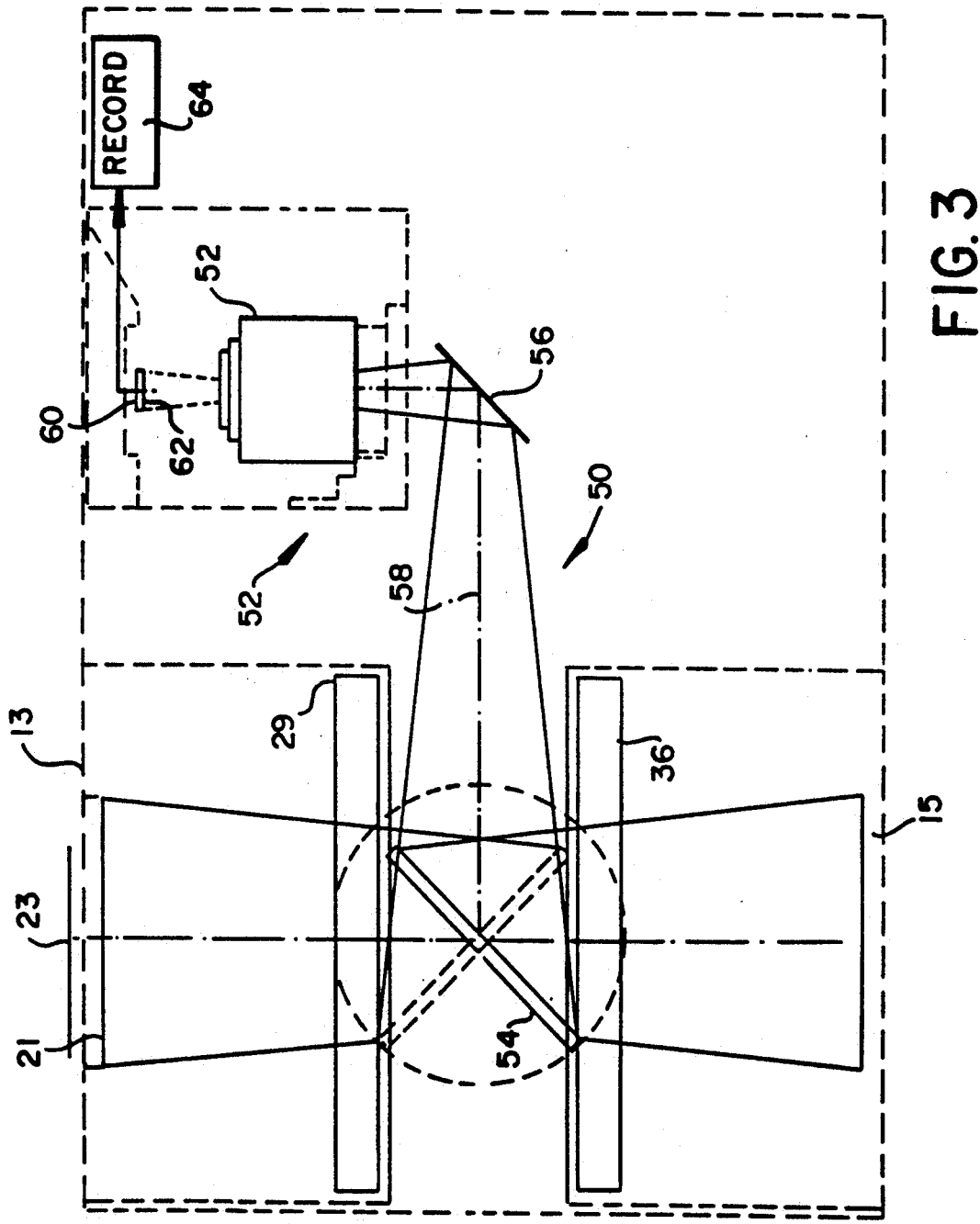

As described briefly above, the present invention is directed to a new and improved re-usable photoprint mounting platen that is employable to support an individual photoprint for image capture by an image scanning apparatus, such as at the lower platen imaging station 15 of the dual imaging station scanner of FIGS. 2 and 3. For this purpose a photoprint support platen pursuant to a first embodiment of the present invention is diagrammatically shown in FIGS. 4 and 5 as comprising a generally rectangular substrate 71, preferably made of a rigid material such as polystyrene plastic, having a first, generally flat mounting surface 73 upon which an individual photoprint, shown at 75, is to be mounted. Substrate 71 has a first, or forward end edge 81 and a second or rearward end edge 83, and first and second side edges 85 and 87. To facilitate interleaving of multiple platens together in a stacked configuration, such as in magazines 32, 34 of the scanner of FIGS. 2 and 3, the forward end of the platen is sloped downwardly from surface 73, as shown at sloped surface 82, while the rear end of the platen is inclined upwardly from bottom surface 88, as shown at upwardly sloped surface region 84. Thus, when the platen is translated to the right or in the direction of arrow A, as viewed in the top view of FIG. 4, the downwardly sloped surface 82 of its forward edge permits the platen to move beneath the upwardly inclined surface 84 of an adjacent platen, thereby allowing the adjacent platen to be lifted up, so that the translated platen may slide beneath the adjacent platen.

A plurality of stand-off elements in the form of parallel rails 91, 93 extend alongside photograph mounting surface area 73 between forward edge 81 and rearward edge 83 of the platen. The forward ends 95, 97 of rails 91 and 93 are sloped in conformance with sloped surface 82 and have a height sufficiently greater than the thickness of a photoprint 75, so that multiple platens may be stacked on top of one another without the mounted photoprint on one platen contacting the underside of an adjacent platen.

Figure 4:
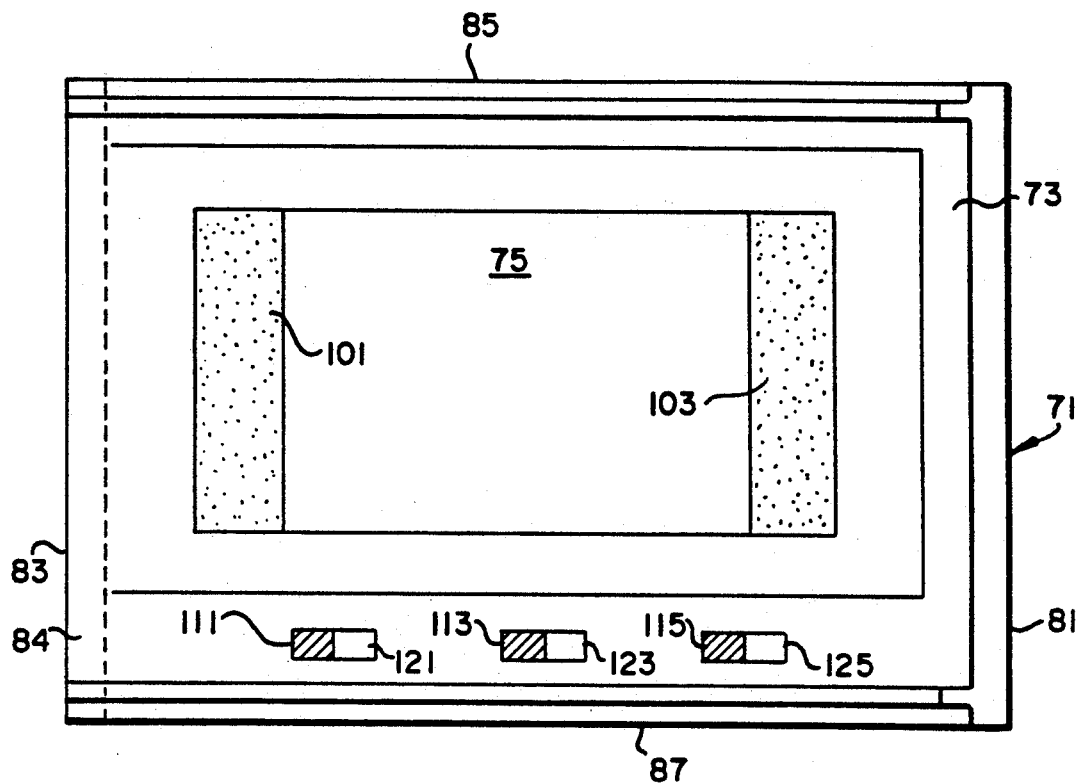
FIGS. 4 and 5 are respective top and perspective views of a first embodiment of a photoprint support platen in accordance with the present invention.

In order to securely mount the photoprint to the platen, mounting surface area 73 has one or more (preferably a plurality of) attachment elements 101, 103 affixed to mounting area 73, for example along the periphery of the mounting area, as shown in FIGS. 3 and 4. For this purpose a respective attachment element may comprise a generally semi-tacky adhesive web, such a strip of Post-It (Trademark 3M Company) or spray mount artist's adhesive Cat. No. 6065, available from the 3M Adhesives, Coatings and Sealers Division of the 3M Company, St. Paul, Minn., which is disposed on the photograph-mounting surface area of the platen, and serves to securely retain the photoprint in place upon on the photograph mounting surface area when the photoprint is pressed against the adhesive element, while allowing the print to be removed after scanning, and allowing the platen to be re-used with subsequent prints.

Figure 5:
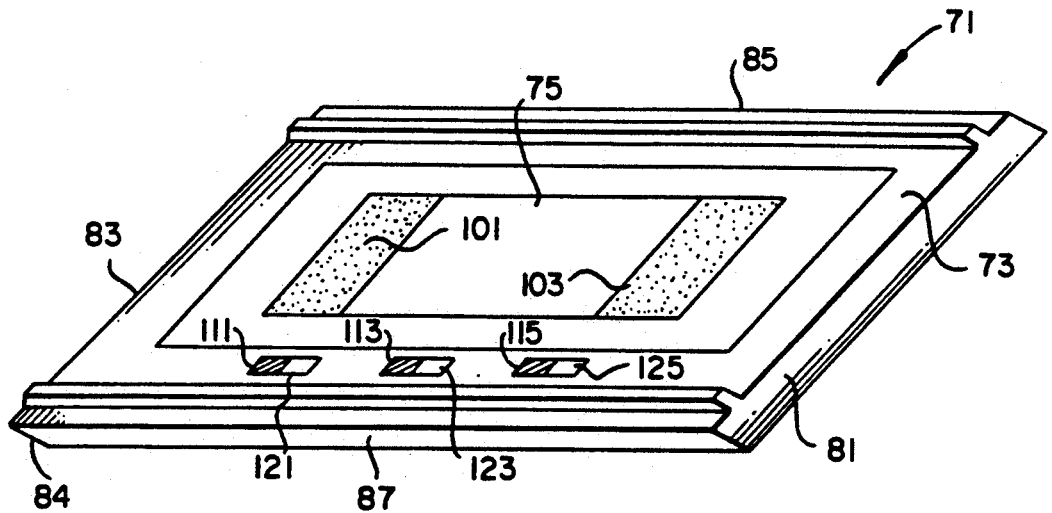

The platen further includes one or more machine-readable control regions, such as bar codes or similar indicia, or, as shown in FIGS. 4 and 5, slidable tabs 111, 113, 115, 117 within respective slots 121, 123, 125, 127 located adjacent to photographic mounting surface area 73, which store machine readable photograph parameter information representative of one or more characteristics of the image on the photoprint, such as photoprint size (e.g. 3R, 4R), aspect ratio (e.g. 4:3, 1:1), image orientation (horizontal (H) or vertical (V)), or print type (monochrome or color). Regions 111, 113, 115, 117 are arranged to be read by sensor elements of the photoprint scanner for controlling the manner in which the photoprint is projected by imaging optics of the scanner onto its opto-electronics image converter and as playback display control information to be recorded on the compact disc.

When the platen is to be used in the course of generating a digitized image of the photoprint, the photoprint is placed within the boundaries of the mounting surface area 73 so that it adheres to attachment strips 101, 103. Once the photoprint is in place, slidable tabs 111, 113, 115, 117 are set to indicate parameters of the photoprint. The platen is then placed in a stack with other platens upon which other photoprints have been similarly mounted and placed in a stack holder, such as in magazine 32 of scanner 10 of the dual imaging station scanner of FIGS. 2 and 3. When the lowermost platen is extracted from magazine 32 by the controlled operation of the drive motor 45, that platen is translated to imaging station 15 so that the image on the photoprint may be projected onto the scanner's photosensor array. Once the image capture process is complete, the platen is translated from the imaging station 15 into magazine 34. Because its forward and rear edges are sloped or bevelled, the platen readily enters the bottom of the magazine and slides beneath the lowermost platen of any other platens that have been previously stacked in the magazine.

Figure 6:
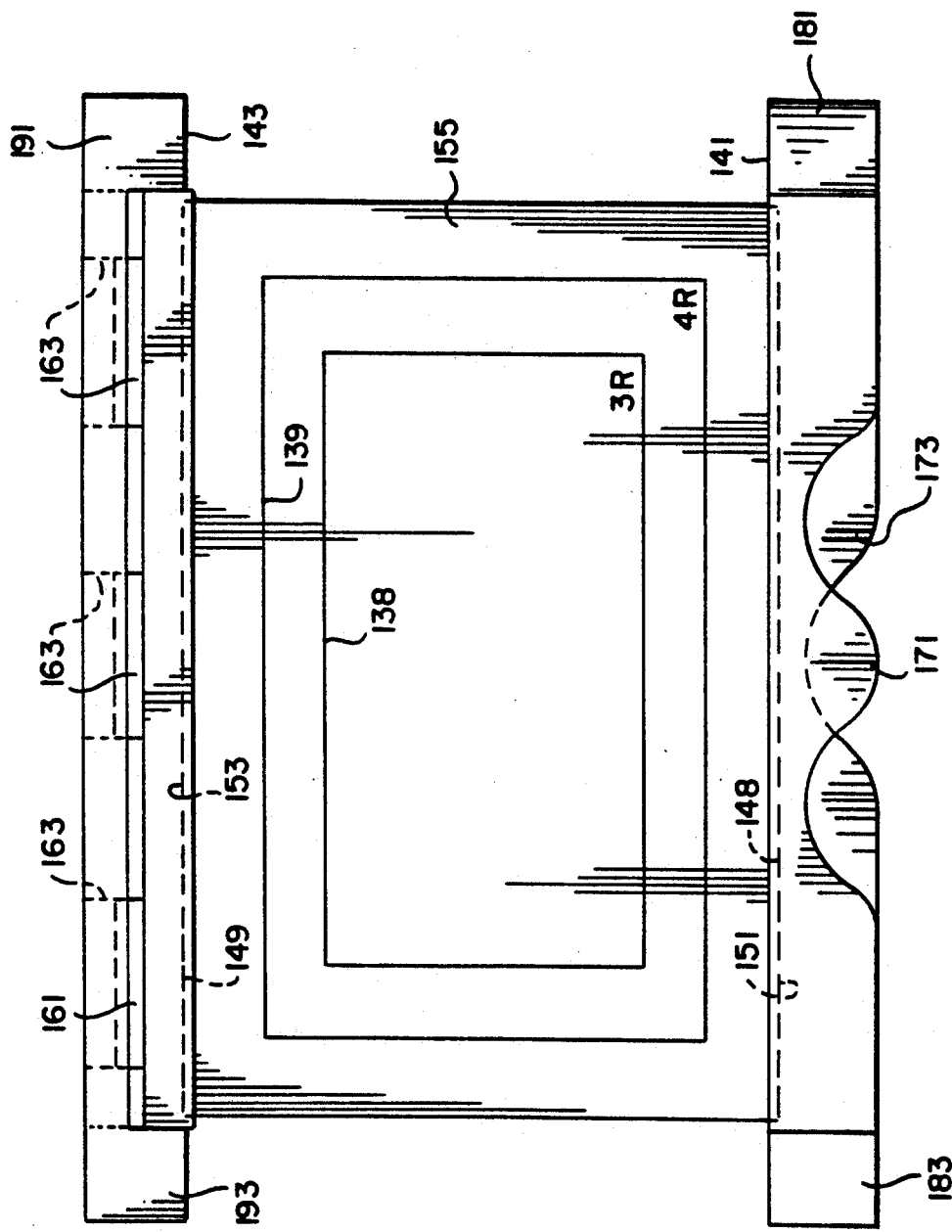
FIGS. 6 and 7 are respective top and perspective views of a second embodiment of a photoprint support platen in accordance with the present invention.
Figure 7:
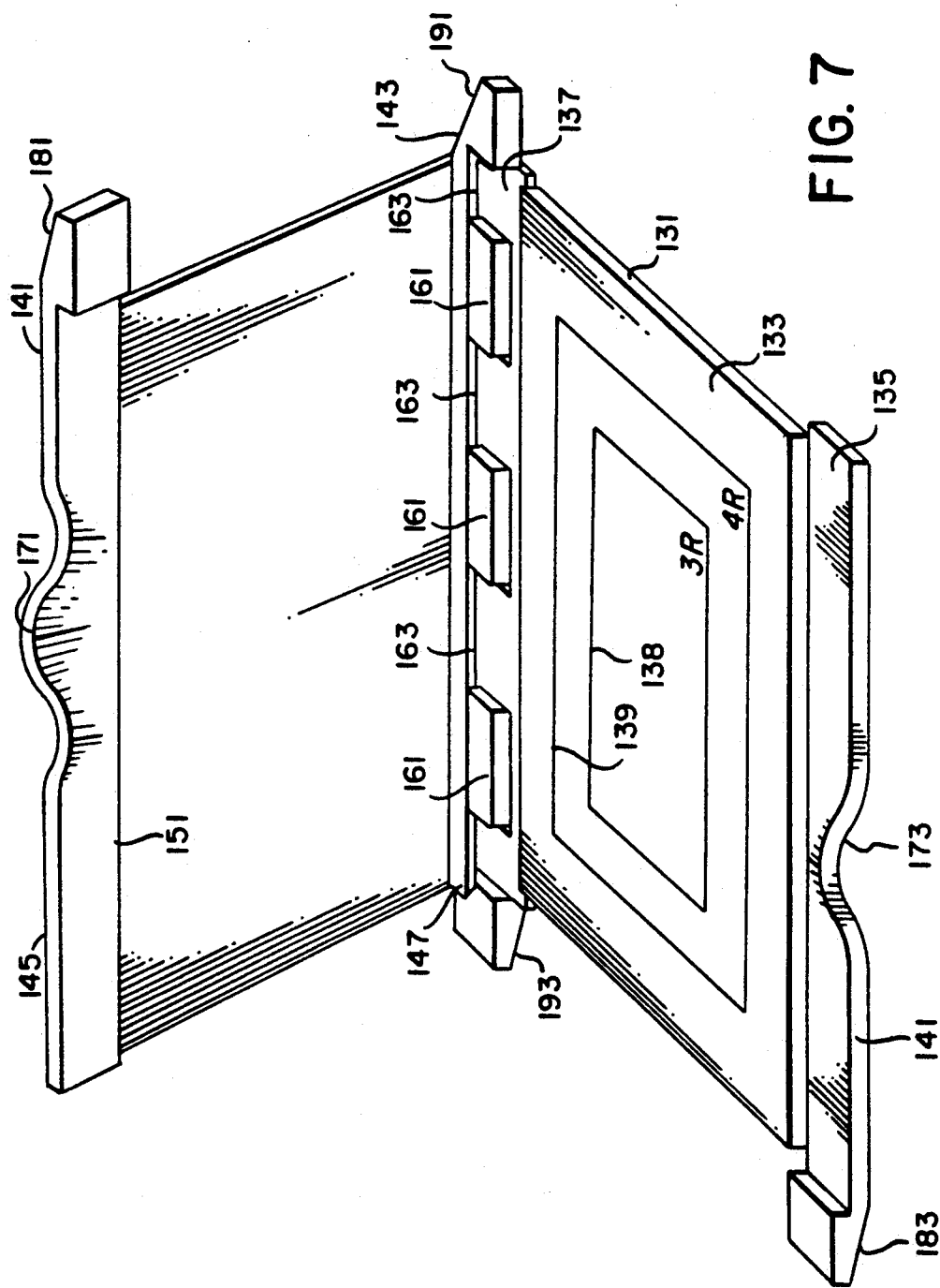

FIGS. 6 and 7 illustrate a second embodiment of the photoprint support platen in accordance with the present invention, comprising a rigid substrate 131 which, like the first embodiment, has a first, generally flat mounting surface 133 upon which an individual photoprint is placed. Side edges of mounting surface 133 of the substrate adjoin lower portions 135, 137 of a pair of segmented side rails 41, 143, which are longer than and extend alongside the photograph mounting surface area 133. Lower portions 135, 137 of side rails 141, 143 are arranged to engage and support respective upper portions 145, 147 of the side rails. Upper portions 145, 147 of the side rails have respective recesses 148, 149 for capturing side edges 151, 153 of a transparent cover plate (e.g. glass plate) 155. Transparent cover plate 55 is arranged to overlie support substrate 131 when the respective portions of the segmented side rails are placed in mutual alignment and abutment with one another.

The respective upper and lower portions 147, 137 of side rail 143 have interleaving tongue and slots regions 161, 163 which provide for folding attachment of the transparent cover plate 155 to the photoprint support substrate 131. As a result, when a photoprint is placed on the surface mounting area 133 of support substrate 131 and the upper and lower portions of siderails 133, 135 are in mutually abutting engagement, the photoprint will be captured or 'sandwiched' between transparent plate 155 and support substrate 131. The respective upper and lower portions 145, 135 of side rail 141 have undulating side contours, as shown at 171, 173 to facilitate manual separation of its upper and lower portions, so that the transparent plate may be easily lifted away from the support substrate, thereby permitting access to the photoprint mounting surface, as shown in FIG. 7.

The overall thickness of each of side rails 141, 143 is greater than the combined thickness of the support substrate 131 and transparent glass cover 155, so that multiple platens may be stacked together without the glass cover contacting the underside of an adjacent platen in the stack. In addition, each end of a side rail has a sloped contour, as shown at 181, 183 for side rail 141 and at 191, 193 for side rail 143, to facilitate interleaving of multiple platens together in a stacked configuration, similar to the interleaving described in the embodiment of FIGS. 4 and 5.

In addition, similar to the first embodiment, substrate 131 may include or more machine readable or optically sensed patterns representative of parameters of the photoprint. For example, a removable bar code sticker 200 may be attached to a recessed portion 210 of upper rail 171. In order to assist the operator in mounting the print, mounting surface area 133 of substrate 131 may be etched with size outlines 138, 139. An appropriate bar code sticker, which contains information representative of parameters of the photoprint is attached to the holder by the operator after inserting the print. The bar code data is used by the scanner in the course of projecting and digitizing the image on the photoprint.

A principal difference between the first and second embodiments is the manner in which a photoprint is retained on the platen. In the first embodiment of FIGS. 4 and 5 an adhesive strip is employed; in the second embodiment, a glass cover plate which may be closed or folded over atop the support substrate is used to secure the photoprint in place. The use of a platen having adhesive strips is intended primarily for mounting photoprints, such as recent snapshots, that are reasonably well preserved. On the other hand the transparent cover plate of the second embodiment serves to 'flatten' the photoprint and is particularly useful in the case of handling older photos which may be 'dog-eared' or torn.

The imaging of a photoprint that has been mounted on a support platen in accordance with the second embodiment of the invention conforms with that for the first embodiment described previously. Plural platens are arranged in a magazine stack and then extracted at the appropriate time and translated to imaging station 15 in FIG. 2. They are then translated to the take up magazine 34.

As will be appreciated from the foregoing description, the present invention provides a re-usable photoprint mounting platen that facilitates presentation of a photoprint to an imaging station of a photoprint imaging scanner, such as the above-described dual imaging station scanner, in a secure protected condition. The configuration of the platen is such that it allows a plurality of photoprint platens to be arranged in a stacked configuration and fed one at the time from a first platen retention magazine to the platen imaging station, and then fed from the platen imaging station to a second take up magazine. The platens stacked in the second magazine are then removed so that the photoprints may be returned to the customer and the platens may be re-used. The platens include means for conveying information parameters about the photoprint which can be updated as required when the platen is re-used with subsequent prints.

While we have shown and described several embodiments of a photoprint platen in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An article of manufacture for securely retaining thereon a sheet of photographic recording material comprising a platen having a first, generally flat mounting surface upon which said sheet of photographic recording material is attachable, said platen also having first and second end edges and first and second side edges, and a plurality of stand-off elements extending above said first surface by a height greater than the thickness of a sheet of photographic recording material, so that multiple platens may be stacked together without a sheet of photographic recording material attached to the mounting surface area of a platen contacting an adjacent platen, said platen further comprising one or more regions, located adjacent to said photographic mounting surface area, for storing machine readable photograph parameter information representative of one or more characteristics of the image on a sheet of photographic recording material that is mountable on said photographic mounting surface area, wherein said machine readable photograph parameter information is alterable.

2. An article of manufacture according to claim 1, wherein said one or more regions comprise slidable elements, located adjacent to said photographic mounting surface area, and the position of which is associated with said photographic parameter information.

3. An article of manufacture according to claim 1, wherein said one or more regions contain bar codes.

4. An article of manufacture according to claim 1, wherein said plurality of stand-offs comprise a plurality of rails which extend alongside said photograph mounting surface area adjacent to the first and second end edges of said platen.

5. An article of manufacture according to claim 1 further including one or more attachment elements by way of which said sheet of photographic recording material is attached to the photograph mounting surface area of said platen.

6. An article of manufacture according to claim 5, wherein a respective attachment element comprises a generally semi-tacky adhesive element disposed on said photograph mountain surface area of said platen, which securely retains said sheet of photographic recording material in place upon on said photograph mounting surface area when said sheet is pressed against said adhesive element.

7. An article of manufacture according to claim 6, wherein an end edge of a platen has a sloped surface so as to permit platens to slide together into a stacked configuration.

8. An article of manufacture according to claim 1, wherein end edges of a platen have sloped contours to facilitate interleaving of multiple platens together in a stacked configuration.

9. A photoprint retention platen for securely retaining thereon a sheet of photographic recording material comprising a substrate having a generally flat mounting surface upon which said sheet of photographic recording material is to be placed, said substrate also having first and second end edges and first and second side edges, first and second side rail elements adjoining the respective first and second side edges of said substrate and adjoining a transparent plate which is arranged to overlie the mounting surface of said substrate and thereby retain a sheet of photographic recording material therebetween, and wherein ends of said side rail elements have sloped contours to facilitate interleaving of multiple platens together in a stack.

10. A photoprint retention platen according to claim 9, wherein side edges of said platen adjoin lower portions of said side rail elements, said side rail elements being longer than and extending alongside the mounting surface area of said platen, said lower portions of said side rail elements being configured to engage and support respective upper portions of said side rails elements, each of which adjoins a respective side edge of said transparent plate.

11. A photoprint retention platen according to claim 10, wherein said transparent plate is arranged to overlie said substrate when the respective portions of the segmented side rails are placed in mutual alignment and abutment with one another.

12. A photoprint retention platen according to claim 11, wherein respective upper and lower portions of one of said side rail elements have interleaving tongue and slots regions which provide for folding attachment of said transparent plate to said substrate.

13. A photoprint retention platen according to claim 12 wherein respective upper and lower portions of a second of said side rail elements have undulating side contours to facilitate manual separation of the upper and lower portions of said second side rail, so that said transparent plate may be lifted away from said substrate, thereby permitting access to its mounting surface.

14. A photoprint retention platen according to claim 13 wherein the overall thickness of each of said side rail elements is greater than the combined thickness of said substrate and said transparent plate, so that multiple platens may be stacked together without the plate contacting the underside of an adjacent platen in the stack.

15. A photoprint retention platen according to claim 9, wherein said platen further comprises one or more regions, located adjacent to said mounting surface for storing machine readable photograph parameter information representative of one or more characteristics of the image on a sheet of photographic recording material that is mountable on said mounting surface.

16. A photoprint retention platen according to claim 15, wherein said one or more regions contain bar codes.

17. A photoprint retention platen for securely retaining thereon a sheet of photographic recording material comprising a generally rigid substrate having a first, generally flat mounting surface upon which said sheet of photographic recording material is fixedly retained, said substrate also having first and second end edges and first and second side edges, a pair of raised rail elements integral with said substrate and extending adjacent to the mounting surface thereof, opposite ends of said platen have sloped surfaces, so as to permit multiple platens to slide together into a stack, and means for securing a sheet of photographic recording material to the mounting surface of said substrate.

18. A photoprint retention platen according to claim 17, wherein said securing means comprises one or more attachment elements affixed to the mounting surface of said substrate for attaching said sheet of photographic recording material to the mounting surface of said substrate.

19. A photoprint retention platen according to claim 18 wherein a respective attachment element comprises a generally semi-tacky adhesive element disposed on said mounting surface of said substrate, which securely retains said sheet of photographic recording material in place upon on said mounting surface when said sheet is pressed against said adhesive element.

20. A photoprint retention platen according to claim 17 wherein said securing means comprises a transparent plate which is arranged to overlie the mounting surface of said substrate and thereby retain a sheet of photographic recording material therebetween.

21. A photoprint retention platen according to claim 20 wherein each of said side rail elements is a segmented side rail element having upper and lower side rail portions, and wherein side edges of said substrate adjoin lower portions of said side rail elements, said side rail elements being longer than and extending alongside the mounting surface area of said substrate, said lower portions of said side rail elements being configured to engage and support respective upper portions said side rails elements, each of which adjoins a respective side edge of said transparent plate.

22. A photoprint retention platen according to claim 21, wherein ends of said side rail elements have sloped contours to facilitate interleaving of multiple platens together in a stack.

23. A photoprint retention platen according to claim 22, said transparent plate is arranged to overlie said substrate when the respective portions of the segmented side rail elements are placed in mutual alignment and abutment with one another.

24. A photoprint retention platen according to claim 22 wherein said platen further comprises one or more regions, located adjacent to said mounting surface, for storing machine readable photograph parameter information representative of one or more characteristics of the image on a sheet of photographic recording material that is mountable on said mounting surface.

25. A photoprint retention platen for securely retained thereon a sheet of photographic recording material comprising a generally rigid substrate having a first, generally flat mounting surface upon which said sheet of photographic recording material is fixedly retained, and one or more regions, located adjacent to said mounting surface, for storing machine readable photograph parameter information representative of one or more characteristics of the image on a sheet of photographic recording material that is mountable on said mounting surface, wherein said regions are alterable and re-usable.

26. A photoprint retention platen according to claim 25, wherein said regions store machine readable photograph parameter information representative of the size and orientation of a sheet of photographic recording material that is mountable on said mounting surface.

* * * * *